(12) United States Patent
Forssell et al.

(10) Patent No.: US 6,705,670 B2
(45) Date of Patent: Mar. 16, 2004

(54) AXIALLY LOADED ARRANGEMENT FOR A MOTOR VEHICLE FRAME

(75) Inventors: Jonas Forssell, Gothenburg (SE); Andréas Tonnqvist, Gothenburg (SE); Mats Boberg, Billdal (SE); Martin Swahn, Hälsö (SE); Egon Strandberg, Sävedalen (SE); Tom Stoddart, Gothenburg (SE); Stina Jonsell, T.O., CA (US); Martin Wedel, Northville, MI (US); Martin Weiman, Göteborg (SE); Thomas Broberg, Göteborg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 09/681,770

(22) Filed: Jun. 1, 2001

(65) Prior Publication Data

US 2002/0093221 A1 Jul. 18, 2002

Related U.S. Application Data

(60) Provisional application No. 60/211,076, filed on Jun. 13, 2000.

(51) Int. Cl.⁷ ................................................. B62D 25/08
(52) U.S. Cl. .............................. 296/187.09; 296/203.02
(58) Field of Search ................................. 296/188, 189, 296/194, 203.02, 205

(56) References Cited

U.S. PATENT DOCUMENTS

| 4,045,075 A | * | 8/1977 | Pulver | 296/205 |
| 4,391,465 A | * | 7/1983 | Piano | 296/194 X |
| 4,660,345 A | * | 4/1987 | Browning | 296/205 X |
| 5,201,566 A | * | 4/1993 | Mori | 296/194 X |
| 5,876,078 A | * | 3/1999 | Miskech et al. | 296/188 X |
| 5,931,520 A | * | 8/1999 | Seksaria et al. | 296/70 |

FOREIGN PATENT DOCUMENTS

| DE | 2233972 | * | 1/1974 | |
| JP | 404011580 | * | 1/1992 | 296/203.02 |

* cited by examiner

Primary Examiner—Dennis H. Pedder
(74) Attorney, Agent, or Firm—Fitch, Even, Tabin & Flannery

(57) ABSTRACT

A stabilized frame assembly 32 for a motor vehicle 10 including a pair 34 of forwardly directed brace members 36, 38. Each brace member 36, 38 of the pair 34 is coupled at a forward end 40 to an impact receiving assembly 46 such as a front bumper assembly. The brace members 36, 38 are coupled for support at a rearward end 42 to a respective one of a pair 48 of stabilized support arrangements 50, 52. Each of the stabilized support arrangements 50, 52 are configured to resist deformation under the influence of crash related impact forces having magnitudes in a manageable design range for the stabilized support arrangement 50, 52. Each of the pair of stabilized support arrangements 50, 52 are constructed to include a plurality of support legs 56 that are configured so that loads or forces transmitted from the supported brace member 36, 38 to the stabilized support arrangement 50, 52 are distributed as substantially axial loads in the plurality of support legs 56.

10 Claims, 3 Drawing Sheets

AXIALLY LOADED ARRANGEMENT FOR A MOTOR VEHICLE FRAME

CROSS REFERENCE TO RELATED APPLICATIONS

This patent application claims the benefit of U.S. Provisional Application No. 60/211,076 filed Jun. 13, 2000.

BACKGROUND OF INVENTION

INDUSTRIAL APPLICABILITY. The present invention finds applicability in the transportation industries, and more specifically in land based motor vehicles such as automobiles and trucks. Of particular importance is the invention's utility in the frame arrangements of passenger vehicles.

Presently, motor vehicles are built around a frame structure that includes a system of interconnected frame members upon which passenger compartments are carried. Lower portions of such frames having primary members that run substantially longitudinally under the vehicle and which are commonly known as rails. These rails, of which there are normally two, are typically configured to include at least two changes in elevation between the front and back of the vehicle. These elevational changes are facilitated by bends in the rails' length. Such bends may be required to accommodate such structural features as axles and other parts of the vehicle that are located in close proximity to the rails, or are located where the rails would extend if not bent. Another general occurrence in the rails' configuration is a bend down behind the engine compartment to a lower elevation below the passenger compartment. A similar configuration is often affected at the back of the vehicle as well with the rails bending up from under the passenger compartment to a higher elevation below the trunk compartment.

During a head-on or rear-end collision, the rails experience bending moments at these bends. Depending on the severity of the collision, failure of one or both of the rails can occur at the bends. This is particularly worrisome because these bends are often located in close proximity to the operator and/or other occupants in the passenger compartment. This is especially true with respect to the front bends that turn down from an elevation under the engine compartment to a lower elevation under the front portion of the passenger compartment. In this configuration, the front bends of each of the two rails are extremely close to the foot well(s) of the front seat occupants. If one or both of the rails fail at their front bends, for instance in a head-on collision, the resulting change to the rails at the bends can cause them to project into the passenger compartment causing injury to the occupants. Still further, a rail failure can result in other components of the vehicle being allowed to be pushed into the passenger compartment. A prime example is again, a head-on collision that causes a frame failure at the front bend. Because of the lost integrity of the frame, components from the engine compartment may be allowed to be pushed back into the passenger compartment with grave results to the occupants.

To eliminate, or at least reduce such rail failures, vehicle designers are known to engineer the distal portions (those portions of the rail close in proximity to the ends of the rail) of the rails to give-way before the interior portion of the rails. In this manner, energy from a collision is dissipated by the collapse of the rail structure itself, primarily at the specially designed distal end(s). Obviously, the strength of the interior or support portion of the rail controls an upper strength limit of the yieldable distal portions of a rail. That is to say, the distal ends must always be "softer" than the middle portions of the rail, or the rail will not fail as designed, which is first at the end portions.

A limiting design parameter is usually the bend feature since this area is most susceptible to failure due to the bending moments that are caused in this area of the rail. It is easy to appreciate that without the vulnerable bend(s), the distal portions of the rails would be able to be strategically strengthened to dissipate greater amounts of crash energy during their controlled collapse.

The easiest remedial approach that enables an increase in distal rail strength, and one that has been exploited by others, is to eliminate or reduce the severity of the bends in the rails. This, however, generally results in a significant reduction in the passenger compartment size and can even affect the vehicle's performance and handling characteristics.

Another way in which vehicle designers have enabled increases in distal end rail strength is by reinforcing the portions of the rails adjacent to the bend areas with extra plates or other such strengthening-type members. Similarly, increases to the dimensions of the rails, such as their thickness, have also been tried for such strengthening purposes. These types of strengthening measures, because of the associated increase in bulk, are difficult to affect in confined spaces, such as in the vicinity of an engine compartment, firewall, foot well and drive shaft tunnel areas. To accommodate such reinforcements, the floor of the passenger compartment has normally been required to be raised higher off the ground, and/or walls of the passenger compartment are recessed inwardly into the compartment. Detrimentally, both remedies result in reduced passenger compartment size. Further, by raising the floor of the passenger compartment, the vehicle's handling characteristics and performance are diminished. That is to say, by raising the passenger compartment, the vehicle's profile and center of gravity are consequently raised. Elevating the vehicle's profile increases wind resistance compromising fuel economy and handling characteristics, while elevating the vehicle's center of gravity also causes handling problems and increases the vehicle's tendency for roll-over accidents.

Reinforcement by increasing the dimensions of the rails in the vicinity of the bends is also not an optimal solution; such reinforcement typically results in an undesirable weight increase that adversely effects the performance of the vehicle and increases the complexity of manufacturing the vehicle frame. Until the present invention, vehicle frame designers have been forced to compromise performance and passenger compartment capacity, as well as detrimentally increase the weight of the vehicle in order to achieve stronger frames and enable more crash absorbent rail members.

In view of the above described deficiencies associated with known rail strengthening measures, the present invention has been developed to alleviate these drawbacks and provide additional benefits in at least safety and performance. These enhancements and benefits are described in greater detail hereinbelow with respect to alternative embodiments of the present invention.

SUMMARY OF INVENTION

In the disclosed embodiment(s), the present invention alleviates the drawbacks described above with respect to known vehicle frames and incorporates several additionally beneficial features. The invention eliminates, or at least significantly reduces, the bending moments experienced at the bends of a rail. This is accomplished by incorporating a force or load distributing arrangement that includes three support members (two members besides the portion of the rail that achieves the change in elevation) positioned substantially at the bend that distributes impact loads experienced at the distal end of the rail as axially loads to the support members. Furthermore, the support configuration makes the load transfer substantially without bending moments being induced in any of the support members. This arrangement allows greater distal rail strength for dissipating crash forces without compromising passenger compartment size or handling and performance characteristics of the vehicle. Moreover, this arrangement is a scalable structure which does not require extensive design modifications as the frame dimensions are increased or decreased to accommodate larger and smaller vehicle platforms. Still further, the support configuration of the invention provides a stronger overall frame structure that results in a quieter vehicle, as well as a vehicle that handles better because of its more rigid or "tight" frame. This strengthening of the frame, as well as the unique configuration of the support members of the new arrangement, better protects occupants inside the passenger compartment because it is harder to compromise. Additionally, the arrangement of the support members forms a "protective cage" about the front seat passenger foot well further protecting the passenger compartment from intrusions by other components of the vehicle under crash circumstances. Of particular significance is the characteristic of the support members' design that helps to establish a barrier between the feet of the front seat passengers and the front wheel assemblies of the vehicles. Heretofore, it was not uncommon for the front wheel assemblies to be pushed back into the foot well area causing injury to the passengers' feet and legs in head-on collisions.

The general beneficial effects described above apply generally to each of the exemplary descriptions and characterizations of the frame designs disclosed herein. The specific structures through which these benefits are delivered will be described in detail hereinbelow.

BRIEF DESCRIPTION OF DRAWINGS

In the following, the invention will be described in greater detail by way of examples and with reference to the attached drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Referring to the Figures, a preferred embodiment of a stabilized frame assembly 32 for a motor vehicle 10, constructed according to the present invention, is illustrated. Forward 12 and rearward 14 directions, as each relates to the vehicle 10 and orientations of components thereof, are shown using directional arrows. These directions are referred to throughout this description for reference purposes and for establishing relative relationships between various components.

Figure 1:
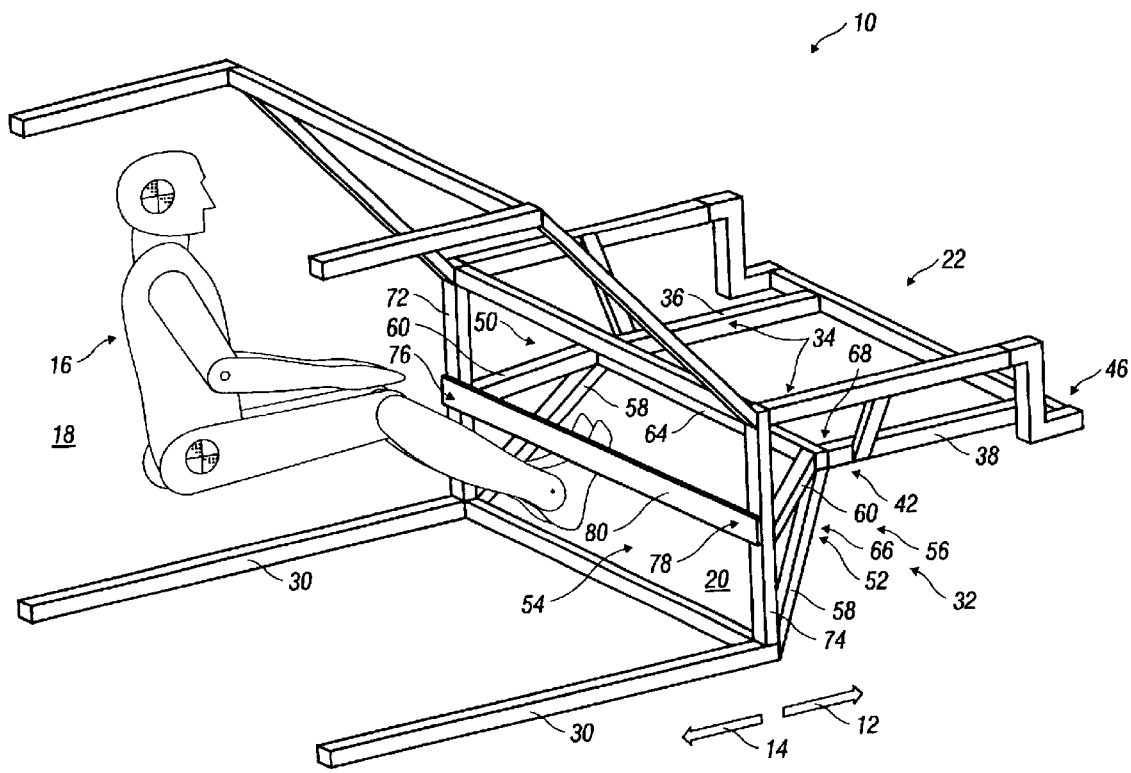
FIG. 1 is a schematic representation of a vehicle incorporating a stabilized frame assembly according to the present invention, including illustration of an operator positioned in a passenger compartment of the vehicle with the operator's feet installed in the protective foot well.

The stabilized frame assembly 32 is schematically represented in FIG. 1. The assembly 32 includes a pair 34 of forwardly directed brace members 36, 38. Each such brace member 36, 38 of the pair 34 is coupled (connected either directly or indirectly) at a forward end 40 to an impact receiving assembly 46 such as a front bumper assembly. The brace members 36, 38 are coupled for support at a rearward end 42 to a respective one of a pair 48 of stabilized support arrangements 50, 52. Each of the stabilized support arrangements 50, 52 are configured to resist deformation under the influence of crash related impact forces having magnitudes in a manageable design range for the stabilized support arrangement 50, 52. By this, it should be understood that each stabilized frame assembly 32 will be designed to collapse in a controlled manner under the influence of impact forces up to a certain magnitude. Therefore, there is a range of forces that can be handled by the assembly 32 spanning from low magnitude (no collision is being experienced) across a continuously increasing range that has an upper limit equal to the magnitude of force under which the brace members 36, 38 and/or the stabilized support arrangements 50, 52 no longer experience a controlled, designed-for collapse.

Figure 5:
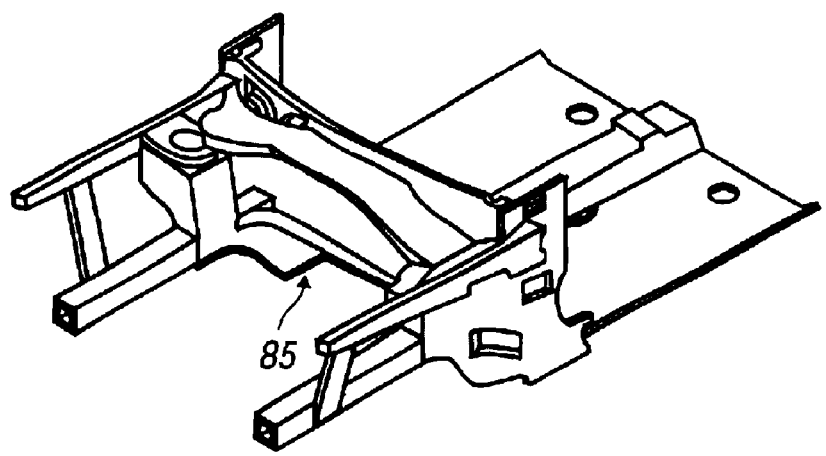
FIG. 5 is a cutaway view looking downward and inwardly at a known frame assembly of conventional design, illustrating the moment-prone connection between the forwardly directed brace member and the undercarriage rail.

A constant goal in motor vehicle design is to advantageously increase this upper limit thereby improving the safety characteristics of the vehicle by increasing the amount of crash energy that is dissipated through the controlled collapse of the brace members. As described above, this has traditionally been limited by the conventionally designed bent support configuration for the forwardly directed brace members. More specifically, traditional designs have had a bent support 85 region configured as a turned down segment extending from the rearward end of the brace member to a forward end of a rail or side member located and running longitudinally under the vehicle passenger compartment. This bent configuration 85 fosters inducement of a substantial bending moment at the bend between the brace members located at an upper elevation and substantially within or under an engine compartment 22 of the vehicle and a lower elevation support rail located under the vehicle's passenger compartment (see FIG. 5 illustrating such a conventional design). In this conventional design, the segment between the upper brace member and the lower rail below the passenger compartment is not configured to transfer forces predominantly axially from the brace member to the rail. As a result, the bending moment experienced at the connective segment causes bending and failure of the connection before full advantage of the brace's capability for absorbing force, via a collapsing yield zone, has been fully exploited. As a result, in order to take even modest advantage of the brace as an absorber and dissipater of crash energy, the mentioned yield zone has been required to be designed unnecessarily "soft" in order to experience controlled energy absorption before the weakness of this moment-prone bend connection fails. The end result, of course, is that less energy can be absorbed than would otherwise be possible if the back support for the brace member were stronger. It is known, however, that tubular members such as those typically used in automotive frame construction are substantially more resistive to failures caused by axial loads than by bending moments caused by similar magnitude forces.

In appreciation of these different load bearing characteristics of such tubular frame members, each of the pair of stabilized support arrangements 50, 52, according to the present invention, are constructed to include a plurality of support legs 56 that are configured so that loads or forces transmitted from the supported brace member 36, 38 to the stabilized support arrangement 50, 52 are distributed as substantially axial loads in the plurality of support legs 56. In this way, configurations according to the present invention substantially eliminate the occurrence of bending moment in all of the support legs 56, including a lower outboard legs 58 which make the direct connection between the brace members 36, 38 and the undercarriage rails 30. By this modification in arrangement alone, without other dimensional changes to the frame members, the manageable range of crash related impact forces that can be handled by the assembly 32 is increased by at least fifty percent over a conventionally designed and unbraced configuration using similar frame members. As a result, the previously "soft" yield zones, are fortified so that the new yield zones 44 collapse in a controlled manner absorbing crash energy even under collision forces exceeding by more than fifty percent those forces that had formally caused catastrophic failure in the bent support design typified by FIG. 5. As a further enhancement, tubular members having octagonal cross-sectional shape may be employed thereby further augmenting the strength of such frame members.

By fostering substantially axial loads in the support legs 56, a weight savings may also be realized for equal energy absorption characteristics. This is advantageous from a cost savings perspective with respect to initial construction costs (less metal in the frame member), fuel economy (the vehicle weights less) and easier compliance with governmental efficiency and emission requirements.

An added benefit of frame assemblies 32 constructed according to the present invention, is that the design is "scalable." This means that the design itself does not have to be changed to increase load capacity characteristics of the assembly 32. That means that if stronger brace systems 34 are required, the plurality of support legs 56 can be fortified by strengthening the legs 56, a change that can be easily accomplished by constructing the legs 56 using heavier gauge (thicker walled) tubular members. "Scalable" also means that the same design can be enlarged or scaled-down, without substantial changes to the frame's 32 basic design; that is, the relative configuration of the constituent members of the assembly. This is a great facilitation in automotive manufacturing in which varying "platforms" will be used for different sized automobiles, but there is a distinct advantage to using the same basic frame design. The present invention allows utilization of common assembly line processes for constructing an array of stabilized frame assemblies 32 configured according to the teachings of the present invention. An example is using one frame assembly design in the manufacture of sub-compact automobiles, with a larger scale version of the same frame design being utilized for sport utility vehicles and luxury cars. Each vehicle's appearance is very different, but the underlying frame assembly 32 may be of the same basic design when constructed according to the teachings of the present invention at substantial cost savings to the manufacturer.

The axially loaded configuration of the present invention is substantially more stable than known designs such as that typified by FIG. 5. That is to say, not only is the capacity for absorbing crash energy from front end collisions enhanced (see arrow 15 in FIG. 3 generally illustrating the direction of forces applied upon a vehicle 10 in a front end or head-on collision), but frame collapses caused by side impacts are also resisted through utilization of this design which fosters axial loading of frame members, instead of moment inducing loading, regardless of the direction from which force is applied to the frame assembly 32. This construction also lends a stiffness to the frame assembly 32 heretofore not achieved. This stiffening of the frame 32 reduces noise and also enhances handling characteristics with an improved "tight" feel provided by the assembly 32 to the incorporating motor vehicle 10.

Figure 2:
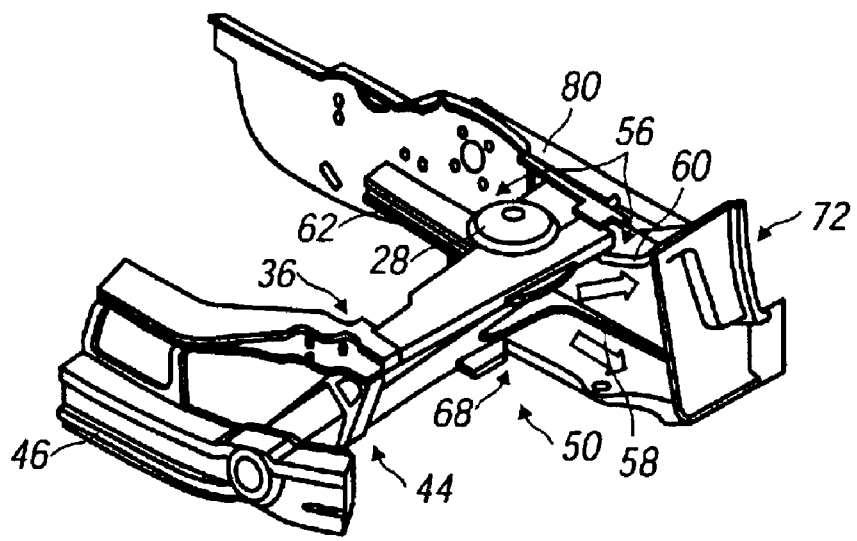
FIG. 2 is a cutaway view looking inwardly, from a fender side, toward a front half portion of a stabilized frame assembly constructed according to the present invention.
Figure 3:
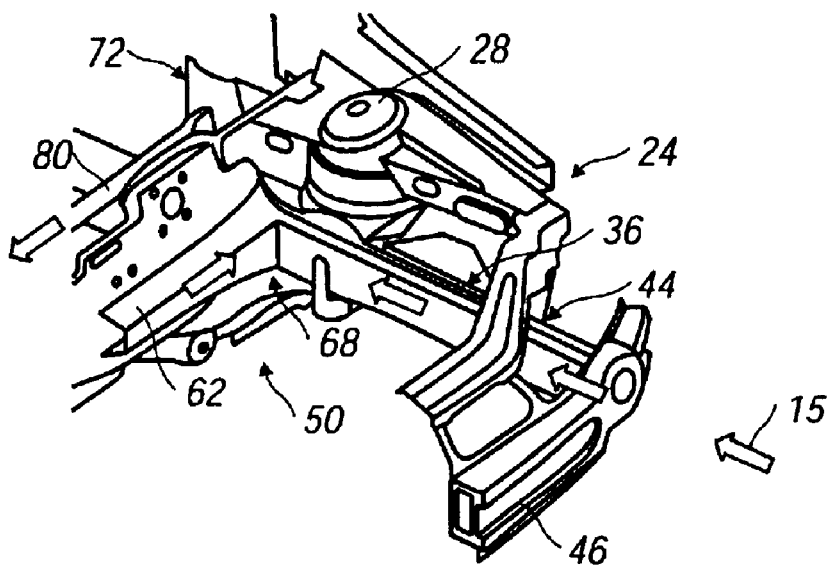
FIG. 3 is a cutaway view looking outwardly from an inboard position at the front half portion of the stabilized frame assembly of FIG. 2.
Figure 4:
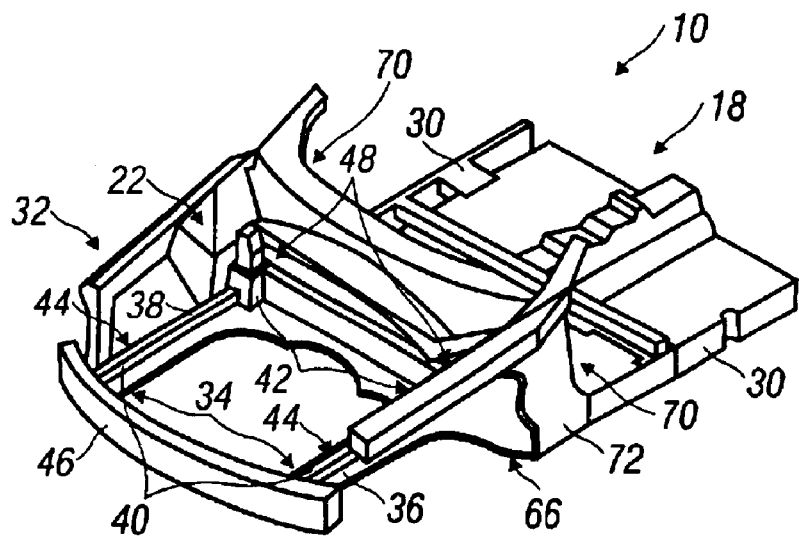
FIG. 4 is a cutaway view looking downward and inwardly at a stabilized frame assembly, including those portions located proximate the passenger compartment.

Preferably, and as illustrated in FIGS. 2 and 3, the plurality of support legs 56 of each of the pair 48 of stabilized support arrangements 50, 52 advantageously number three. The advantage of such a design can be best understood by thinking of a three-legged stool. The support provided to the platform of a three-legged stool is not only balanced, but the loads in the legs of the stool can be limited primarily to axial loads, provided the supporting contacts at the distal ends (bottom ends) of the legs are properly configured.

As shown, the plurality of three support legs 56 includes the lower outboard leg 58, an upper outboard leg 60 and an inboard leg 62. Each of the three legs 56 of a group 50, 52 are coupled at a forward end thereof to a back end of one of the two brace members 36, 38. The lower outboard leg 58 and the upper outboard leg 60 are positioned at a location between a front wheel well 24 and a front occupant foot well 20 of the vehicle 10. In this way, the lower outboard leg 58 and the upper outboard leg 60 together form an occupant protective barrier 66, or a portion thereof, in front of the occupants of the vehicle in crash conditions helping to shield them from invasions by the front wheel assembly into the passenger compartment.

By strategic configuration, and as best appreciated from FIG. 1, the lower outboard 58 and the upper outboard leg 60 are oriented to be spread apart, and all three of the legs 56 are positioned sufficiently forward of the front occupant foot well 20 so that the feet of front passengers are accommodated in an interior space 54 between the two stabilized support arrangements 50, 52 without encroachment into the front occupant foot well 20 by the leg members 56, themselves. In this manner not only is space made for the front passenger's feet, but the protective barrier 66 is arranged thereabout.

The upper outboard leg 60 of each of the pair 48 of stabilized support arrangements 50, 52 are each coupled to one of a pair 70 of A-pillars 72, 74 at a medial location 76, 78 of the respective A-pillar 72, 74 so that axial forces transmitted from the upper outboard legs 60 to the pair 70 of A-pillars 72, 74 are directionally divergent and act at least partially in an outboard direction on each of the pair 70 of A-pillars 72, 74. A tension member 80 is coupled between the pair 70 of A-pillars 72, 74 for restraining the divergent and at least partially outwardly directed forces exerted on the pair 70 of A-pillars 72, 74 by the upper outboard legs 60.

In a preferred embodiment, the tension member 80 is a lateral brace adapted to receive mountings of dash components. Additionally or alternatively, the lateral brace 80 may be adapted to mountingly receive a steering column.

As may be appreciated from reference to the several drawings of the invention, the plurality (three) of support legs 56 of a particular support arrangement 50, 52 and the associated forwardly directed brace member 36 or 38 are coupled together at a juncture. As illustrated, the four members 58, 60, 62 and 36 or 38 come together at the junctures 68 for either direct or indirect interconnection.

Regarding each pair 48 of stabilized support arrangements 50, 52, at least two of the plurality of support legs 56 are directed at least partially rearwardly from the juncture. As shown, those two support legs 56 having such orientation are the two outboard legs 58, 60. The lower outboard leg 58 is coupled between the juncture and an undercarriage rail 30 that extends backward and below a passenger compartment 18 of the vehicle 10 at an elevation lower than the juncture 68. This configuration is preferred to others that have been tried that position the brace members 36, 38 at a similar elevation with the rails 30 under the passenger compartment 18 thereby avoiding the bend connection. For comparison purposes, this less advantageous design has been discussed in greater detail hereinabove with respect to FIG. 5, and will only now be summarized. It should be appreciated, however, that this inferior configuration has at least two detrimental results associated with the necessary raising of the passenger compartment 18: the first is an increased wind resistance experienced by the vehicle and the second is a raised center of gravity that can result in unstable traveling characteristics in the incorporating vehicle.

Regarding each of the pair 48 of stabilized support arrangements 50, 52, the lower outboard leg 58 extends backwardly, downwardly and outboardly from the juncture 68 to an undercarriage rail 30. Each of the upper outboard legs 60 are coupled between one of the junctures 68 and a respective A-pillar 72, 74. As shown, each of the A-pillars 72, 74 take the form of an upright frame member located at a forward position of a passenger compartment 18 of the vehicle 10. The inboard legs 62 each extend inboardly from the junctures 68. In one particularly preferred embodiment, the inboard legs 62 is coupled between the juncture 68 of one stabilized support arrangement 50 and the juncture 68 of the other 52 of the pair 48 of stabilized support arrangements 50, 52. Advantageously, this arrangement may take the form of a common cross member 64 coupled between the junctures 68 of the pair 48 of stabilized support arrangements 50, 52 and that serves as the inboard leg 62 of each of the stabilized support arrangements 50, 52.

Each of the upper outboard legs 60 extends backwardly, upwardly and outboardly from each respective juncture 68 to where it is connected to one of the A-pillars 72, 74 at a medial portion 76, 78 thereof.

As described in greater detail above, each brace member 36, 38 has a yielding zone 44 adapted to collapse in a controlled manner under the influence of crash condition impacts experienced at the impact receiving assembly 46. In this way, the yielding zones 44 serve to buffer transmission of such impacts to vehicle occupants 16 in the passenger compartment 18 located rearward of the pair 34 of brace members 36, 38. Each of the yielding zones 44 are adapted to absorb at least fifty percent more impact force than traditional yielding zones because of the improved support enabled by the arrangements 50, 52.

One, and normally two spring towers 28 are each adapted to carry a front wheel assembly of the vehicle 10 and are fixed, one each to each of the brace members 36, 38 at a location rearward of the respective yielding zones 44. By integral construction between the spring tower 28 and the brace member 36, 38, a more efficient and stable arrangement is established.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. A stabilized frame assembly for a motor vehicle, the stabilized frame assembly comprising:
   a pair of forwardly directed brace members, each brace member of said pair being coupled at a forward end to an impact receiving assembly and coupled for support at a rearward end to one of a respective pairs of stabilized support arrangements, and
   each of said pair of stabilized support arrangements further comprising a lower outboard support leg, an upper outboard support leg, and an inboard support leg,
   wherein said lower outboard leg and said upper outboard leg are positioned at a location between a front wheel well and a front occupant foot well of the vehicle, thereby forming an occupant protective barrier there between in a crash situation, and
   wherein said lower outboard, upper outboard and inboard support legs are configured so that loads transmitted from said supported brace member to said stabilized support arrangement are distributed as substantially axial loads in said lower outboard, upper outboard and inboard support legs.

2. A stabilized frame assembly for a motor vehicle, the stabilized frame assembly comprising:
   a pair of forwardly directed brace members, each brace member of said pair being coupled at a forward end to an impact receiving assembly and coupled for support at a rearward end to one of a respective pairs of stabilized support arrangements, and
   each of said pair of stabilized support arrangements further comprising a lower outboard support leg, an upper outboard support leg, and an inboard support leg,
   wherein said lower outboard leg and said upper outboard leg are positioned at a location between a front wheel well and a front occupant foot well of the vehicle, thereby forming an occupant protective barrier there between in a crash situation,
   wherein said lower outboard, upper outboard and inboard support legs are configured so that loads transmitted from said supported brace member to said stabilized support arrangement are distributed as substantially axial loads in said support legs,
   wherein said lower outboard leg and said upper outboard leg are spread sufficiently apart, and
   wherein said upper outboard leg and said inboard leg are positioned sufficiently forward so that the front occupant foot well is accommodated in an interior space between said two stabilized support arrangements without encroachment into the front occupant foot well by said lower outboard leg, said upper outboard leg and said inboard leg.

3. A stabilized frame assembly for a motor vehicle, the stabilized frame assembly comprising:
   a pair of forwardly directed brace members, each brace member of said pair being coupled at a forward end to an impact receiving assembly and coupled for support at a rearward end to one of a respective pairs of stabilized support arrangements, each of said pair of stabilized support arrangements further comprising a lower outboard support leg, an upper outboard support leg, and an inboard support leg, wherein said lower outboard, upper outboard and inboard support legs are configured so that loads transmitted from said supported brace member to said stabilized support arrangement are distributed as substantially axial loads in said support legs, wherein each said upper outboard leg of each of said pair of stabilized support arrangements is coupled to one of a pair of A-pillars at a medial location of the respective A-pillar, whereby axial forces transmitted from said upper outboard legs to said pair of A-pillars are directionally divergent and act at least partially in outboard direction on each of said pairs of A-pillars, and a tension member coupled between said pair of A-pillars for restraining said divergent and at least partially outwardly directed forces exerted on said pair of A-pillars, wherein said tension member is a lateral brace for receiving mountings of dash components.

4. A stabilized frame assembly for a motor vehicle, the stabilized frame assembly comprising:

a pair of forwardly directed brace members, each brace member of said pair being coupled at a forward end to an impact receiving assembly and coupled for support at a rearward end to one of a respective pairs of stabilized support arrangements, each of said pair of stabilized support arrangements further comprising a lower outboard support leg, an upper outboard support leg, and an inboard support leg, wherein said lower outboard, upper outboard and inboard support legs are configured so that loads transmitted from said supported brace member to said stabilized support arrangement are distributed as substantially axial loads in said support legs, wherein each said upper outboard leg of each of said pair of stabilized support arrangements is coupled to one of a pair of A-pillars at a medial location of the respective A-pillar, whereby axial forces transmitted from said upper outboard legs to said pair of A-pillars are directionally divergent and act at least partially in outboard direction on each of said pairs of A-pillars, and a tension member coupled between said pair of A-pillars for restraining said divergent and at least partially outwardly directed forces exerted on said pair of A-pillars, wherein said tension member is a lateral brace for mountingly receiving a steering column.

5. A stabilized frame assembly for a motor vehicle, the stabilized frame assembly comprising:

a pair of forwardly directed brace members, each brace member of said pair being coupled at a forward end to an impact receiving assembly and coupled for support at a rearward end to one of a respective pairs of stabilized support arrangements, and each of said pair of stabilized support arrangements further comprising a lower outboard support leg, an upper outboard support leg, and an inboard support leg, wherein said lower outboard, upper outboard and inboard support legs are configured so that loads transmitted from said supported brace member to said stabilized support arrangement are distributed as substantially axial loads in said support legs, wherein for each of said pair of stabilized support arrangements, said lower outboard, upper outboard and inboard support legs and the associated forwardly directed brace member are coupled together at a juncture, and wherein said lower outboard leg is coupled between said juncture and an undercarriage rail extending backwardly and below a passenger compartment of the vehicle at an elevation lower than said juncture.

6. A stabilized frame assembly for a motor vehicle, the stabilized frame assembly comprising:

a pair of forwardly directed brace members, each brace member of said pair being coupled at a forward end to an impact receiving assembly and coupled for support at a rearward end to a respective one of a pair of stabilized support arrangements, and each of said pair of stabilized support arrangements further comprising a lower outboard support leg, an upper outboard support leg, and an inboard support leg, wherein said lower outboard, upper outboard and inboard support legs are configured so that loads transmitted from said supported brace member to said stabilized support arrangement are distributed as substantially axial loads in said support legs, wherein for each of said pair of stabilized support arrangements, said lower outboard, upper outboard and inboard support legs and the associated forwardly directed brace member are coupled together at a juncture, wherein for each of said pair of stabilized support arrangements, said lower outboard leg is coupled between said juncture and an undercarriage rail extending backwardly and below a passenger compartment of the vehicle at an elevation lower than said juncture, and wherein for each of said pair of stabilized support arrangements, said lower outboard leg extends backwardly, downwardly and outwardly from said juncture.

7. A stabilized frame assembly for a motor vehicle, the stabilized frame assembly comprising:

a pair of forwardly directed brace members, each brace member of said pair being coupled at a forward end to an impact receiving assembly and coupled for support at a rearward end to a respective one of a pair of stabilized support arrangements, and each of said pair of stabilized support arrangements further comprising a lower outboard support leg, an upper outboard support leg, and an inboard support leg, wherein said lower outboard, upper outboard and inboard support legs are configured so that loads transmitted from said supported brace member to said stabilized support arrangement are distributed as substantially axial loads in said support legs, wherein for each of said pair of stabilized support arrangements, said lower outboard, upper outboard and inboard support legs and the associated forwardly directed brace member are coupled together at a juncture, wherein for each of said pair of stabilized support arrangements, said lower outboard leg is coupled between the respective juncture associated with said stabilized support arrangement and an undercarriage rail configured to extend backwardly and below a passenger compartment of the vehicle at an elevation lower than said juncture, wherein for each of said pair of stabilized support arrangements, said lower outboard leg extends backwardly, downwardly and outwardly from said juncture, wherein for each of said pair of stabilized support arrangements, said upper outboard leg is coupled between the respective juncture associated with said stabilized support arrangement and an A-pillar, said A-pillar being an upright frame located at a forward position of the passenger compartment of the vehicle and said upper outboard leg configured to extend backwardly and outwardly from said juncture, said upper outboard leg connected to said A-pillar at a medial portion of said A-pillar, and wherein for each of said of stabilized support arrangements, said inboard leg is coupled between said juncture of the stabilized support arrangement and the other juncture associated with said other of said two forwardly directed brace members.

8. The stabilized frame assembly as recited in claim 1, further comprising:

said lower outboard leg and said upper outboard leg being spread sufficiently apart, and said upper outboard leg and said inboard leg being positioned sufficiently forward that the front occupant foot well is accommodated in an interior space between said two stabilized support arrangements without encroachment into the front occupant foot well by said lower outboard leg, said upper outboard leg and said inboard leg.

9. The stabilized frame assembly as recited in claim 5, wherein for each pair of stabilized support arrangements, said lower outboard leg extends backwardly, downwardly and outwardly from said juncture.

10. The stabilized frame assembly as recited in claim 7, wherein a common cross member coupled between said junctures of said pair of stabilized support arrangements constitutes said inboard leg of each stabilized support arrangement.

* * * * *

UNITED STATES PATENT AND TRADEMARK OFFICE
CERTIFICATE OF CORRECTION

PATENT NO. : 6,705,670 B2  
DATED : March 16, 2004  
INVENTOR(S) : Jonas Forssell et al.

Page 1 of 1

It is certified that error appears in the above-identified patent and that said Letters Patent is hereby corrected as shown below:

<u>Title page,</u>  
Item [75], Inventors, change "Boberg" to -- Moberg --.  
Item [73], Assignee, change "Gothenburg" to -- Göteborg --.

Signed and Sealed this

Sixth Day of July, 2004

JON W. DUDAS  
*Acting Director of the United States Patent and Trademark Office*